United States Patent [19]
Arendt et al.

[11] 4,152,281
[45] May 1, 1979

[54] MOLTEN SALT SYNTHESIS OF LEAD ZIRCONATE TITANATE SOLID SOLUTION POWDER

[75] Inventors: Ronald H. Arendt; Joseph H. Rosolowski, both of Schenectady, N.Y.

[73] Assignee: General Electric Company, Schenectady, N.Y.

[21] Appl. No.: 896,634

[22] Filed: Apr. 17, 1978

[51] Int. Cl.² .............. C04B 35/46; C01G 23/00; C04B 35/48
[52] U.S. Cl. .................. 252/62.9; 106/73.3; 423/598; 423/DIG. 12
[58] Field of Search ............. 423/598, DIG. 12; 252/62.9; 106/73.3

[56] References Cited

U.S. PATENT DOCUMENTS

| 2,841,470 | 7/1958 | Berry et al. | 423/598 |
| 3,708,438 | 1/1973 | Levy | 423/598 |
| 3,760,068 | 9/1973 | Winter et al. | 423/598 |
| 3,793,443 | 2/1974 | Arendt | 423/594 |
| 3,963,630 | 6/1976 | Yonezawa et al. | 423/598 |

FOREIGN PATENT DOCUMENTS 765169  10/1971  Belgium ................ 423/598

Primary Examiner—Herbert T. Carter
Attorney, Agent, or Firm—Jane M. Binkowski; Joseph T. Cohen; Charles T. Watts

[57] ABSTRACT

Sodium chloride and/or potassium chloride is added to an aqueous suspension of the oxides of lead, titanium and zirconium and stirred until the suspension converts to a gel which is then heated evaporating the water and melting said chloride in which the oxides dissolve and react precipitating lead zirconate titanate.

7 Claims, 1 Drawing Figure

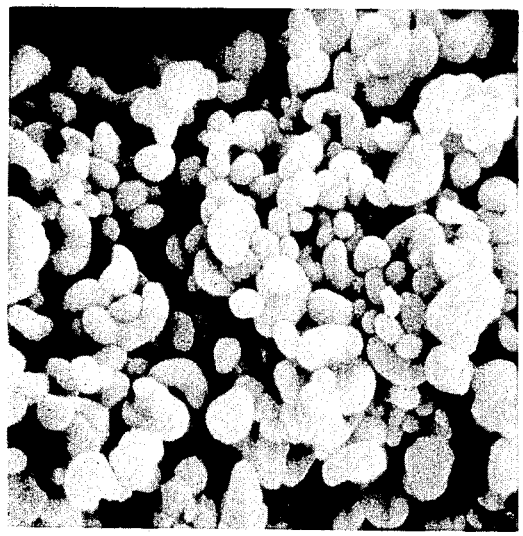

MOLTEN SALT SYNTHESIS OF LEAD ZIRCONATE TITANATE SOLID SOLUTION POWDER

The present invention relates to the preparation of lead zirconate titanate (LZT) solid solution powder of predetermined composition, i.e. stoichiometry.

Conventionally, lead zirconate titanate powder is prepared by the high temperature solid state reaction of appropriate precursor compounds. The reaction product is in the form of relatively large strongly self-bonded, particle aggregates which must be comminuted to the desired approximaterly 1.0 micron particle size before fabrication into ceramic articles.

One of the inadequacies of this conventional procedure is that the product, in commercial practice, is not fully reacted to yield uniform composition on a microscopic level. In cases where the physicochemical properties depend on the composition and its uniformity, the nonuniform compositon of the conventional product usually leads to less than optimum properties. Although procedures can be adopted in the conventional process to minimize these variations, the penalty in additional effort generally is considerable.

The comminution portion of the conventional process is also potentially detrimental in that significant, uncontrollable quantities of undesirable impurities can be introduced from the grinding media. Again, extraordinary precautions can be taken to minimize the comminution effects, but with attendant penalties.

The present invention circumvents the inadequacies of the conventional process by substituting for the solid state reaction, a liquid phase reaction scheme utilizing a molten salt solvent with subsequent precipitation of the product which does not require comminution. In the present process, the reactants, and/or their precursors, are slightly soluble in the molten salt solvent, therefore allowing literally atomic mixing in the liquid phase of the reactants. The solubility of the reactants is such that it exceeds the corresponding solubility of the lead zirconate titanate in the molten salt solvent. Hence, the observed product precipitates spontaneously from the molten salt solution. The reactants will continually dissolve to maintain a reactant-saturated solution until they are totally consumed by product formation.

Preferably, the reaction temperature in the present process is that required to attain reasonable reaction rates in the molten salt solvent, and it can be significantly lower than in the corresponding conventional solid state synthesis. Similarly, the reaction time can be as short as about 30 minutes or shorter compared with several hours for solid state reaction.

The present process allows the composition of the LZT powder to be predetermined and controlled. Since the present LZT grains are produced by precipitation from a saturated solution, they are chemically homogeneous, i.e. they are of uniform composition on a microscopic level. Also, since the individual LZT grains range up to about 1 micron in size and are generally submicron, they do not require any crushing or grinding operations with their attendant contamination with impurities from the equipment employed before they can be fabricated into useful ceramic articles.

Those skilled in the art will gain a further and better understanding of the present invention from the detailed description set forth below, considered in conjunction with FIG. 1 accompanying and forming a part of the specification which is a photomicrograph (magnified 10,000 X) of an agglomerate of lead zirconate titanate powder produced by the present process.

Briefly stated, the present process for producing lead zirconate titanate solid solution powders of predetermined composition, i.e. stoichiometry comprises providing particulate reactant oxides of zirconium ($ZrO_2$), titanium ($TiO_2$) and lead (PbO) in said stoichiometric amounts, admixing said particulate reactant oxides with at least sufficient water with at least sufficient stirring to produce a suspension, adding to said stirred suspension a chloride salt selected from the group consisting of sodium chloride, potassium chloride and mixtures thereof, and maintaining said stirring until the resulting suspension converts to a solid gel, heating said gel to a reaction temperature at least sufficient to melt said chloride salt but lower than the temperature at which said lead zirconate titanate melts, said melt in molten form being a solvent for said reactant oxides of zirconium, titanium and lead, maintaining said reaction temperature dissolving and reacting said reactant oxides in said molten salt and precipitating lead zirconate titanate, and recovering said precipitated lead zirconate titanate. Alternatively, particulate precursors for the reactant oxides can be used.

In the present process, LZT solid solution powder of predetermined stoichiometry, i.e. composition, is prepared. Specifically, in the LZT formula $Pb(Zr_xTi_{1-x})O_3$, where x is any value less than the integer 1, and for forming a useful piezoelectric ceramic has a minimum value of 0.1, the atomic ratio of zirconium to titanium can be varied and it is the same as the ratio of the mole fraction of zirconium oxide to titanium oxide used to produce the LZT powder. The particular ratio of oxides of zirconium and titanium used depends upon the properties which such ratio imparts to the resulting LZT powder, and consequently to the ceramic fired from such powder. In the LZT formula, $Pb(Zr_xTi_{1-x})O_3$, one mole of lead oxide is required for each mole comprised of the oxides of titanium and zirconium. However, when used in these stoichiometric amounts, residual concentrations of zirconium oxide and titanium oxide usually are left in the molten salt, typically in the range of about $10^{-2}$ to $10^{-10}$ mole fraction, due to loss of lead oxide through vaporization. Preferably, to minimize these residual reactant concentrations and to make up the lead oxide vaporization losses, the lead oxide is used in an amount in excess of stoichiometric, i.e. at least about 1 weight % and preferably at least about 2 weight % in excess of stoichiometric. This excess amount of lead oxide drives the reaction towards the formation of LZT to completion. Any excess lead oxide which may remain is easily removed with an acid such as acetic acid.

In carrying out the present process, PbO, $ZrO_2$ and $TiO_2$ are the reactant oxides. However, since these are the most stable of the oxides of these elements, any of the oxides of zirconium, lead or titanium are operable in the present process since, on heating, they convert to the more stable oxide form at temperatures below the reaction temperature. The oxides can be of commercial or technical grade, and their particular purity depends largely on the particular application of the resulting LZT powder. Specifically, the oxides should not contain any impurities which would have a significantly deleterious effect on the resulting LZT powder or on its particular application.

The reactant oxides, i.e. oxides of lead, zirconium and titanium, should be of a size which is suspendible in water with stirring and which allows the reaction to take place. Generally, these oxides are used and are satisfactory in the particle size range in which they are available commercially, which ordinarily ranges from submicron up to about 25 microns. The reactant powders should also be free of large, hard aggregates, i.e. about 100 microns or larger in size, which might survive the mixing process and prevent sufficient reactant contact for satisfactory reaction rates.

Water, preferably at room or ambient temperature, is admixed with the particulate reactant oxides in an amount which, with stirring, is at least sufficient to form a slurry, i.e. a complete suspension. Preferably, to insure good contact and complete reaction, the particulate oxides are initially admixed and the water is admixed with the resulting reaction mixture. The particulate oxides can be admixed by a number of techniques which do not introduce undesirable impurities into the resulting LZT powder such as, for example, using a ceramic milling medium identical to one of the reactants, or by wet mixing in a high speed blendor with preferably distilled or deionized water, depending on the application of the LZT powder. Generally, about 1 liter of water per 1 kilogram of reaction composition or mixture, i.e. particulate oxides of lead, zirconium and titanium in at least stoichiometric amounts, is satisfactory. Amounts of water significantly in excess of about 1.5 liters per 1 kilogram of reaction mixture provide no significant advantage. The water preferably is distilled or deionized depending on the final application of the resulting LZT powder.

The water and reaction composition or mixture are admixed to suspend the particulate oxides to form a suspension. Vigorous stirring should be employed to obtain a complete suspension. Settled material will generally not react completely. Preferably, such mixing or stirring is carried out with stainless steel or plastic stirrers, for example a propeller, in a stainless steel or plastic, preferably Teflon, lined vessel to prevent introduction of impurities into the suspension.

In the present process the chloride salt is selected from the group consisting of sodium chloride, potassium chloride and mixtures thereof. The chloride salt is added to the stirred suspension, preferably at room or ambient temperature, and stirring of the suspension of continued sufficiently to maintain its homogeneity until it converts to a solid gel. When the chloride salt dissolves in the water, the resulting ions hydrolyze the lead compound. For example, lead oxide is hydrolyzed to the hydroxide while a precursor for lead oxide may be hydrolyzed to the hydroxide or carbonate. The hydrolyzed lead compound converts the suspension to a gel. The resulting gel is not a flowable material but a firm solid gel which cannot be stirred.

The chloride salt solvent is used in a minimum amount of at least about 20% by weight of the total amount of reactant oxides and chloride salt solvent. Amounts of chloride salt lower than about 20% by weight are not practical since the desired reaction will not proceed. There is no upper critical maximum amount of chloride salt, but amounts of chloride salt higher than about 80% by weight of the total amount of reactant oxides and chloride salt solvent provide no significant advantage. As the amount of chloride salt or salt mixture is increased from 20% by weight to about 50% by weight, the amount of individual grains or particles present in the resulting LZT powder increases correspondingly, and with an amount of chloride salt or salt mixture above about 50% by weight, substantially all or all of the LZT powder recovered consists essentially of individual grains or crystallites.

The gel is heated in air to a reaction temperature at which the chloride salt is molten. This heating can be carried out in one step, or if desired in two steps, and preferably, it is carried out in a vessel lined with a material which does not introduce impurities or significant impurities into the reaction mixture depending on the purity desired in the LZT powder. Frequently, it is more practical to heat the gel, for example at a temperature from about 373° K. (100° C.) to about 498° K. (225° C.), in a suitable vessel such as a Teflon-lined vessel, to evaporate the water therefrom producing a cake or cake-like product wherein the particles are maintained in intimate contact, and which, being smaller in volume than the gel, can be transferred to a reaction vessel suitable for the higher temperature required for reaction such as platinum or platinum lined or stabilized zirconia crucibles.

The particular reaction temperature used depends largely on the chloride salt used and reaction rate desired, i.e. rate of precipitation of lead zirconium titanate desired. In molten form, the present chloride salt is a solvent for the reactant oxides, and the minimum reaction temperature is the temperature at which the chloride salt or salt mixture melts and for sodium chloride alone it is about 1073° K. (800° C.) whereas for potassium chloride alone it is about 1063° K. (790° C.). All mixtures of sodium chloride and potassium chloride form a mixture which melts at a temperature below the melting point of sodium chloride alone and thus, for the eutectic mixture of 50 mole % potassium chloride —50 mole % sodium chloride the minimum reaction temperature is 931° K. (658° C.). Preferably, in the present invention, the minimum reaction temperature is at least about 10° K. above the melting point of the chloride salt or salt mixture since such a temperature insures complete melting of chloride salt and also increases the fluidity of the molten salt producing increased wetting of the reaction mixture. However, the maximum reaction temperature is always below the melting point of the lead zirconate titanate being precipitated, which is approximately 1623° K. (1350° C.) but which may vary somewhat depending upon the particular stoichiometry of the LZT precipitate. Particularly preferred is a reaction temperature ranging from about 1173° K. (900° C.) to about 1373° K. (1100° C.) since it is not difficult to maintain and provides high reaction rates without significant vaporization of the molten salt solvent.

At reaction temperature the chloride salt melts and the oxides dissolve and react in the molten salt precipitating lead zirconate titanate. The reaction temperature is maintained until the reaction is completed. The particular period of reaction time depends largely on reaction temperature as well as the amount of chloride salt used and is determinable empirically. When the reaction is completed, the reacted mass is cooled at any convenient rate, preferably in air and preferably to about room temperature.

The cooled LZT-containing reacted mass is a solid, brick-like in texture and hardness, comprised of LZT particles distributed throughout a matrix of solidified chloride salt. Water, preferably distilled or deionized to prevent introduction of impurities and preferably at room temperature, is added to the solid reacted mass in an amount at least sufficient to dissolve away the chloride salt content therefrom. The solubility of the present chloride salt is about 0.3 kilogram per liter of water at room temperature. This dissolution preferably is carried out in a plastic vessel, and as a practical matter with mixing to substantially shorten dissolution time, using, for example, a motor driven plastic or stainless steel stirrer. As the chloride salt dissolves, the solid mass disintegrates leaving a fine LZT powder that contains no perciptibly agglomerated material, i.e. perceptible to the eye.

The LZT powder can be recovered from the aqueous supernatant chloride solution by a number of techniques. For example, the LZT powder can be recovered by decanting the supernatant solution and drying the LZT powder in air. The particular recovery technique depends on the impurities which may be present, such as excess lead when lead oxide is initially used in excess amount, and on the purity required in the ceramic fabricated from the powder. Specifically, the supernatant solution will have an high ionic strength which will cause the LZT powder to flocculate and settle when mixing is stopped. The supernatant can therefore be nearly quantitatively decanted to allow repeated washings of the LZT powder with distilled water. Preferably, washings of the LZT powder should be repeated with distilled water in an amount sufficient to form a thin slurry or suspension with the powder until a stage is reached where the supernatant will remain milky white after about 10 minutes of settling, indicating cessation of flocculation. At this point the residual chlorine ion concentration is low enough in supernatant solution so as not to interfere with the removal of excess lead is present. Excess lead can then be removed conveniently by adding enough of a concentrated acid subsequently removable by heat, preferably acetic acid, to make the slurry acidic. Preferably, the LZT slurry is made about 1.0 Molar acidic, and for example, this requires about 4 liters of 1 Molar acetic acid per 1 kilogram of LZT powder. The resulting slurry preferably is mixed at room temperature in air for about 30 to 60 minutes. The color of the LZT powder during such mixing should lighten due to dissolution of the excess lead oxide added initially. Mixing is then discontinued and a flocculating agent which is organic and soluble in water, preferably an anionic flocculant, is added in an amount which is sufficent to flocculate and settle the LZT powder. After several washings and settlings, the wet powder is dried. Preferably, the flocculating agent is added in aqueous solution, about 0.1 gram of flocculant per 100 grams of water usually being satisfactory, and preferably the flocculating agent is used only in an amount necessary to settle the powder. For production of an LZT powder of high purity, the flocculating agent should be completely removable by heating the powder in air at temperatures below the melting point of the powder and preferably not higher than about 1073° K. (800° C.). Preferably, to remove any remaining water, acetic acid and flocculant, it is heated at about 773° K. (500° C.) for about 20 minutes.

In the present process, if desired, a particulate inorganic or organic precursor of any of the oxides of lead, titanium or zirconium can be used, i.e. substituted for the particulate oxide. The precursor should be of a size suspendible in water with mixing. The precursor should be a solid at room temperature, and at or below the reaction temperature used, it should decompose completely to form the oxide and by-product gas or gases leaving no contaminants in the reacted mass. Representative of the precursors of any of the oxides of lead, titanium or zirconium useful in the present process are the carbonates, hydroxides and nitrates. The precursor should be used in an amount sufficient to produce the respective oxide in at least stoichiometric amount.

The present LZT powder is light yellow in color but darkens upon exposure to light, and therefore, it ranges in color from light yellow to dark yellow or tan. The powder is free-flowing and can be in the form of aggregates or in the form of the individual powder grains, but usually it is a mixture of both. The aggregates which range in size from about 1 micron to about 20 microns, are particles consisting essentially of a cluster of smaller sized particles or grains weakly bonded together autogeneously, i.e. such bonding is believed to be caused by Van der Waal's forces or by self-bonding, i.e. neck growth between grains. The individual powder grains range up to about 1 micron in size and usually are submicron. The aggregates are friable and readily break down to the individual grains during subsequent pressing into a green body. The grains have a smooth surface and a curvilinear contour of substantially spheroidate shape. In some instances the grains are somewhat lobular in shape but still have a curvilinear contour. In addition, the grains are characterized by the absence of exterior fracture-induced planar surfaces and sharp protuberant angles.

X-ray diffraction analysis of the as-produced LZT powder showed no phase other than lead zirconate titanate. It also showed that the peaks in the powder patterns are not sharp indicating that the powder is not well crystallized, i.e. it has a considerable degree of crystal disordering present. However, when the powder is pressed and fired into a ceramic, X-ray diffraction patterns of powder crushed from the ceramic show sharp lines indicating a well crystallized material.

The present LZT powder can be prepared free of impurities or free of significant impurities. Therefore, its properties are reproducible from batch to batch. Specifically, when the same procedure is used for preparing batches of the LZT powder and also for fabricating these batches into ceramic bodies, the electric and piezoelectric properties of the ceramic bodies are reproducible, typically within ±4%. In contrast, the reproducibility of electric and piezoelectric properties of ceramics fabricated from conventional solid state reaction LZT powder typically ranges within ±10%.

The present LZT powder is useful for producing ceramic bodies having a variety of applications, and because of their electric and piezoelectric properties, they are particularly useful as transducers.

A number of techniques can be used to fabricate the present LZT powder into a useful ceramic body. Specifically, the LZT powder is pressed into a green body of desired size and shape and fired at a temperature below its melting point of about 1623° K. (1350° C.) to produce a fired body, i.e. polycrystalline ceramic body, having a density of at least about 7000 Kg.m$^{-3}$.

A number of techniques can be used to shape the LZT powder into a green body, preferably using shaping tools and techniques that do not introduce impurities or any significant impurities into the powder. For example, the powder can be extruded, injection molded, die-pressed, isostatically pressed or slip cast to produce the green body of desired shape. Any lubricants, binders or similar materials used in shaping the powder should have no significant deteriorating effect on the properties desired in the ceramic fired therefrom. Such materials are preferably of the type which evaporate on heating at relatively low temperatures, preferably below 473° K. (200° C.), leaving no significant residue. The green body should have a density of at least about 4000 Kg.m$^{-3}$ and preferably at least about 5000 Kg.m$^{-3}$ or higher, to promote densification during firing.

Firing of the green body is carried out at atmospheric pressure at a temperature preferably ranging from about 1373° K. (1100° C.) to about 1648° K. (1375° C.) in air or in an oxygen-enriched sintering atmosphere, and preferably in oxygen. Firing shrinks, i.e. densifies, the green body into a polycrystalline body, i.e. ceramic which generally ranges in density from about 7500 Kg.m$^{-3}$ to about 7900 Kg.m$^{-3}$. The period of time for firing is determinable empirically and depends largely on the final density desired as well as oxygen content of the sintering atmosphere and sintering temperature. The rate of densification increases with increasing oxygen content in the firing atmosphere and also with increasing firing temperature.

The invention is further illustrated by the following example wherein the procedure was as follows.

EXAMPLE 1

In this example, lead zirconate titanate powder was prepared to produce the predetermined stoichiometry $Pb(Zr_{0.52}Ti_{0.48})O_3$.

Lead oxide, PbO, (reagent grade, >99% pure), titanium oxide, $TiO_2$, (reagent grade >99% pure), and zirconium oxide, $ZrO_2$, (reactor grade, 99.5% pure) powders were used. 117.78 grams of $TiO_2$ and 196.77 grams of $ZrO_2$ were admixed with ~0.5 liters of distilled $H_2O$ and comminuted in a stainless steel blendor at room temperature for about 60 seconds producing a substantially uniform mixture. This mixture was then added along with 669.19 grams of PbO and an additional 1.0 liter of distilled water at room temperature to a plastic vessel provided with a motor driven plastic coated steel propeller. The resulting mixture was stirred at the rate of 1000–3000 rpm, and the vigorous stirring produced a complete suspension of the oxide particles which ranged from submicron size up to about 25 microns in the water. This stirring was continued maintaining all of the oxide particles in suspension while 0.45 kilogram of NaCl and 0.45 kilograms of KCl was added to the stirred suspension. Stirring was maintained and in about 15 minutes the stirred suspension gelled completely forming a solid gel which could not be stirred.

This gel was placed in a Teflon-lined vessel and heated in air at 473° K. (200° C.) for about 15 hours (overnight) whereby its water content was evaporated leaving a dried cake about one-half the size of the gel.

The dried cake was placed in a platinum-lined vessel and covered loosely with a platinum-lined cover to prevent introducion of impurities and placed into an air furnace pre-heated to the reaction temperature of 1000° C. After about 60 minutes at 1273° K. (1000° C.), the vessel was removed from the furnace and allowed to cool to room temperature.

The reacted product was brick-like in texture and hardness. It was placed in about 4.2 liters of distilled water in a plastic vessel with a motor driven plastic coated stainless steel stirrer. After 30 minutes of stirring, the brick-like cake product disintegrated completely into a fine powder that contained no perceptible aggregated material.

When stirring was stopped, the powder flocculated and settled completely, and the supernatant solution was decanted. The powder was then washed about four times with distilled water until the supernatant remained milky white after about 10 minutes of settling time indicative of deflocculation and complete or almost complete removal of chloride ion.

4.2 Liters of dilute 1 Molar acetic acid were added to the slurry making the slurry 1.0 Molar acid. Mixing of the resulting slurry was continued at room temperature for 30 minutes during which time the color of the powder lightened, i.e. became a lighter yellow, due to dissolution of the excess lead which had been added initially as lead oxide.

An aqueous flocculating solution comprised of 0.02 gram of anionic flocculant (a polyamide imide powder sold under the trademark Hercaloc 821) in 20 grams of distilled water was then added to the stirred slurry. The powder was allowed to settle and the supernatant was then decanted. The acetic acid treatment, flocculation and decantation was repeated twice.

The resulting LZT powder was then washed with dilute acetic acid ($1 \times 10^{-3}$ M), flocculated with the aqueous flocculating solution and the supernatant decanted, and this step was done five times. The resulting wet powder was dried by heating in air at 423° K. (150° C.). The dried LZT powder was then heated in air at about 773° K. (500° C.) for about 3 hours to remove any remaining water, acid and flocculant.

About 1000 grams of LZT powder were produced. The powder was light yellow in color, free-flowing and did not have any perceptible aggregates, i.e. perceptible to the eye. On exposure to light, however, the exposed portions of the powder turned to a light tan.

X-ray diffraction analysis of a portion of the powder showed no phase other than lead zirconate titanate, and the breadth of the diffraction peaks indicated the existence of disorder in the crystal structure.

A portion of the powder is shown in FIG. 1 which shows an aggregate composed of a cluster of grains wherein the grains have a smooth surface and a curvilinear contour of substantially spheroidate shape. In some instances the grains are somewhat lobular in shape but still have a curvilinear contour. In addition, the grains are characterized by the absence of exterior fracture-induced planar surfaces and sharp protuberant angles.

Stearic acid, as a pressing lubricant, was incorporated into the LZT powder in an amount of 2% by weight of the powder. Specifically, the stearic acid was dissolved in benzene, the resulting solution added to the powder, and the mixture milled at room temperature for about 24 hours in a polyethylene jar using stabilized zirconia balls. This procedure broke down any large aggregates.

The milled mixture was poured into an open beaker and the benzene evaporated by applying heat. The powder was stirred constantly during drying to prevent stratification or segregation of the stearic acid in the powder as its solvent evaporated. The dry powder was then passed through a 60 mesh screen after which it was ready for pressing.

A cemented carbide die (sold under trademark Carboloy) of 2.54 cm diameter was used for pressing and for preparing each sample. Specifically, about 5 grams of powder were loaded and pressed at 69 MPa (10 Kpsi) holding 1 minute at pressure. This yielded a green body of about 2.5 mm thickness. In order to insure uniform density, these green disks were then placed in a rubber bag, immersed in oil, and isostatically pressed at around 340 MPa (50 Kpsi). The densities of the resulting green bodies were determined from their weight and dimensions and were found to be around 5700 Kg/m$^3$.

After pressing, the stearic acid binder was burned out of all the green disks by laying them on a powder of their own composition spread on a stabilized zirconia plaque and firing uncovered in air for 1 hour at 873° K. (600° C.). The fractional weight loss during this step was within the experimental uncertainty of the amount of stearic acid lubricant added to the powder.

To carry out the final firing, the green disks were placed in a stack of 5 to 6 in a stabilized zirconia crucible. Loose LZT powder of the same composition as the disks were placed under, around and over the stack as well as between the individual disks. The crucible was then covered with an alumina disk. All of the alumina and zirconia ware was "seasoned" before first being used to fire the disks by being used to fire the loose LZT powder only.

The final firing was carried out in a box type furnace having a working space of dimensions approximately 10 cm × 25 cm. The disks were heated at a rate of 125° K./hour to a firing temperature of 1598° K. (1325° C.), held there for one hour, then the power was cut-off and the fired disks allowed to furnace cool (overnight). Oxygen was bled into the furnace during the entire firing cycle. The resulting fired disks had densities, which were determined by water displacement using Archimedes method, typically of about 7100 Kg/m$^3$.

A number of the fired disks, i.e. polycrystalline ceramic bodies having a density of 7100 Kg/m$^3$ were tested for their electrical and piezoelectrical properties.

The poling procedure used was to apply fired-on silver paste electrodes to the disks and to pole them at 393° K. (120° C.) in a bath of a fluorinated hydrocarbon (sold under the trademark Fluorinert) using a field of 2.36 MV/m (60 V/mil). The field was applied for 3 periods of 5 minutes each with a reversal of direction after each of the first 2 periods. Dielectric constant and dissipation factor (loss tangent) at 1 KHz were measured using a 1615 Capacitance Bridge. After aging 20 days after being poled, the average dielectric constant was about 930 and the loss tangent about 0.002. These numbers are about 27% greater and 50% less, respectively, then those found in the literature for this composition (ref. "PIEZOELECTRIC CERAMICS", by JAFFE, COOK AND JAFFE, ACADEMIC PRESS, page 146). Having a lower loss tangent is a generally desirable improvement. The higher dielectric constant of this composition would be beneficial in those applications requiring a higher dielectric constant and a high Curie temperature since the usual way of increasing the dielectric constant is to add to dopant such as strontium, which also lowers the Curie temperature.

In copending U.S. patent application. Ser. No. 896,633 entitled "Molten Salt Synthesis Of Modified Lead Zirconate Titanate Solid Solution Powder" filed of even date herewith in the names of Ronald Henry Arendt and Joseph Henry Rosolowski, and incorporated herein by reference, there is disclosed that sodium chloride and/or potassium chloride is added to an aqueous suspension of the oxides of lead, titanium, zirconium and cationic modifiers and stirred until the suspension converts to a gel which is then heated, evaporating the water and melting said chloride in which the oxides dissolve and react precipitating modified lead zirconium titanate.

What is claimed is:

1. A process for producing lead zirconate titanate solid solution powder given by the formula Pb(Zr$_x$Ti$_{1-x}$)O$_3$, where x is any value less than the integer 1 which comprises providing particulate reactant oxides of zirconium, titanium and lead in the mole ratios given in said formula, admixing said particulate oxides or particulate precursors for said oxides with at least sufficient water with at least sufficient stirring to produce a suspension, adding to said stirred suspension a chloride salt in an amount of at least about 20% by weight of the total amount of said reactant oxides and said chloride salt, said chloride salt being selected from the group consisting of sodium chloride, potassium chloride and mixtures thereof, maintaining said stirring until the resulting suspension converts to a gel, heating said gel to a reaction temperature at least sufficient to melt said chloride salt, said precursor decomposing completely at or below said reaction temperature to form said reactant oxide and by-product gas, said salt in molten form being a solvent for said reactant oxides, maintaining said reaction temperature dissolving and reacting said reactant oxides in said molten salt and precipitating said lead zirconium titanate, and recovering said precipitated lead zirconate titanate by dissolving said chloride salt and separating said precipitated lead zirconate titanate from the resulting salt solution.

2. A process according to claim 1 wherein said amount of said oxide of lead is at least 1 weight % in excess of stoichiometric amount.

3. A process according to claim 1 wherein said reactant oxides range in particle size from submicron up to about 25 microns.

4. A process according to claim 1 wherein said reactant oxides or precursors therefor are mixed before being admixed with said water to form said suspension.

5. A process according to claim 1 wherein said chloride salt is a mixture comprised of 50 weight % sodium chloride and 50 weight % potassium chloride.

6. A process according to claim 1 wherein said reaction temperature ranges from about 931° K. for the eutectic mixture of sodium chloride and potassium chloride up to below the melting point of said precipitated lead zirconate titanate.

7. A process according to claim 1 wherein said reaction temperature ranges from 1173° K. to 1373° K.

* * * * *